Figure 1:
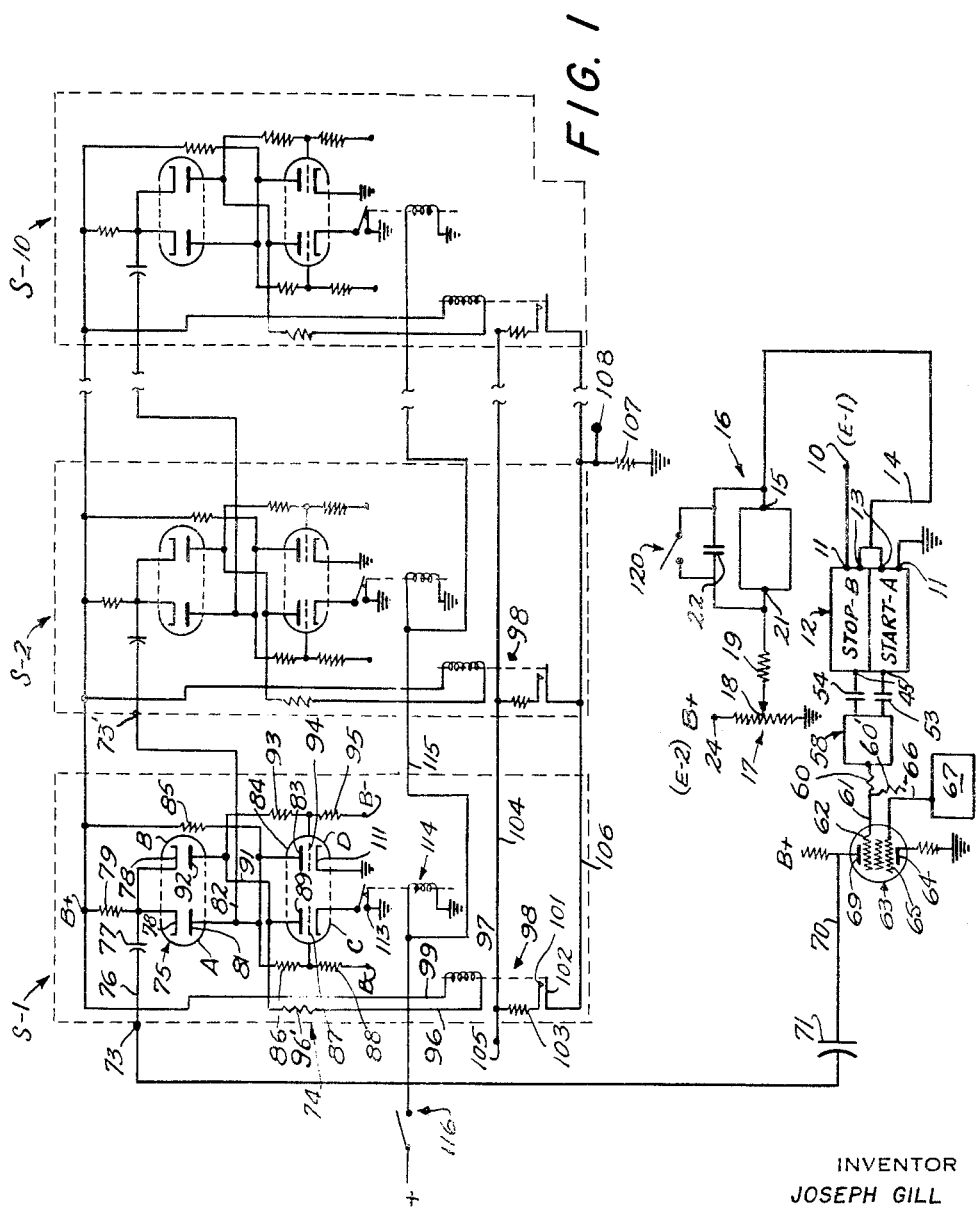

Aug. 15, 1961  J. GILL  2,996,253
COMPUTING EQUIPMENT
Filed March 20, 1958  2 Sheets-Sheet 1

INVENTOR
JOSEPH GILL
BY
Dean, Fairbank & Hirsch
ATTORNEYS

Aug. 15, 1961 J. GILL 2,996,253
COMPUTING EQUIPMENT
Filed March 20, 1958 2 Sheets-Sheet 2

INVENTOR
JOSEPH GILL
BY
Dean, Fairbank & Hirsch
ATTORNEYS

United States Patent Office 2,996,253
Patented Aug. 15, 1961

2,996,253
COMPUTING EQUIPMENT
Joseph Gill, Hicksville, N.Y., assignor, by mesne assignments, to Hagan Chemicals & Controls, Inc., Pittsburgh, Pa., a corporation of Pennsylvania
Filed Mar. 20, 1958, Ser. No. 722,787
5 Claims. (Cl. 235—195)

As conducive to an understanding of the invention, it is noted that where in a computing equipment of the type that determines a function of two or more factors based upon a given input voltage which is proportional to one of the factors, pulses are developed related to successive increments of such input voltage until a number of pulses have been developed related to the total input voltage, and with each successive increment one or more relays are actuated related to the total input voltage, and with each successive increment one or more relays are actuated related to the cumulative number of pulses to set resistance in circuit to provide an output voltage that is compared with the total input voltage, if a comparison must be made of each preceding output voltage based upon the cumulative number of pulses at the time before proceeding to the comparison of the subsequent output voltage based upon the cumulative number of pulses due to the next increment, the rate of operation is limited due to the relay closure time involved.

Thus, if, say, 1,000 cumulative increments of output voltage are to be successively compared to the total input voltage, there must be 1,000 successive relay closures and as the pulse interval time must be greater than the relay closure time, i.e., say 10 milliseconds for the pulse intervals and 5 milliseconds for the relay closure time, then with 1,000 pulses it will take 10 seconds for a complete cycle.

It is accordingly among the objects of the invention to provide a computing equipment that is relatively simple in construction and dependable in operation and which will afford rapid selection, by actuation of one or more relays, of resistance of value proportional to a given input signal in a time interval that is in the order of the actuation of a single relay.

According to the invention from its broader aspect, one of the input voltages related to a given factor is compared electronically with a separate and distinct time varying reference voltage, i.e., a saw tooth voltage, that has no relation to the input voltage. A pulse generator is operatively connected to a relay actuated resistor network when the saw tooth voltage is initiated to energize predetermined relays of the network as pulses are delivered thereto and is cut off from the network when the reference voltage bears a predetermined relation to the input voltage.

During the period that the pulse generator is connected to the network, pulses will be delivered thereto and depending upon the number of pulses that are delivered, predetermined relays of the network will be energized.

When the pulse generator is cut off from the network at which time the reference voltage will have a predetermined relation to the input voltage, relays will have been actuated to place resistance in circuit of value proportional to the value of the input voltage, or one of the factors.

As the electronic comparison of the reference voltage to the input voltage is rapidly effected in a negligible time interval and as there is no need to wait for successive relay closures, it is apparent that the resistance of value proportional to the input voltage may be placed into circuit in a period of time much less than that required where successive comparisons of output voltage to input voltage must be effected.

According to one embodiment of the invention, where the individual relay closure time is in the order of say 5 milliseconds, the time constant of the reference voltage generator is less than 5 milliseconds and the pulse repetition frequency is such that the desired number of pulses related to the maximum input voltage will be applied to the network before the value of the reference voltage bears the desired predetermined relation to the value of the input voltage.

According to another embodiment of the invention the time constant of the reference voltage generator can be greater than the relay closure time. In such case, a programmer is provided so that no output is afforded until sufficient time has elapsed for the relays to close and the saw tooth voltage which has a time constant of say 6 milliseconds is recycled say every 11 milliseconds. The pulse generator in such event could have a pulse repetition frequency such that the desired number of pulses related to the maximum input voltage would be applied to the network during each cycle of the reference voltage generator.

Figure 2:
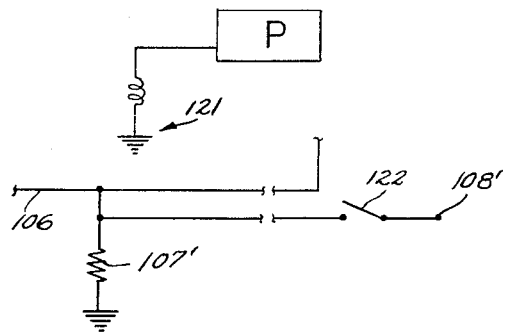
Figure 3:
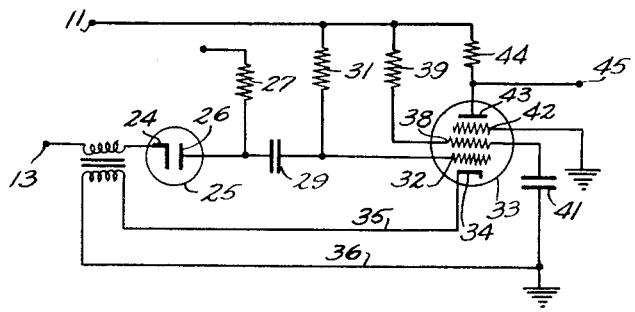
Figure 4:
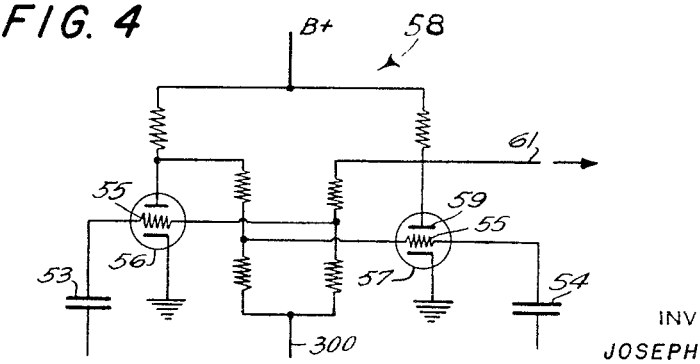

In the accompanying drawings in which are shown one or more of various possible embodiments of the several features of the invention, FIG. 1 is a circuit diagram of the equipment, FIG. 2 is a fragmentary circuit diagram of another embodiment, FIG. 3 is a circuit diagram of a portion of the comparator unit, and FIG. 4 is a circuit diagram of the multivibrator.

Referring now to the drawings, the input terminal 10 to which a voltage E–1 is to be applied, is connected to the signal input terminal 11 of section B of a comparator unit 12 comprising a pair of identical sections A and B. The signal input terminal 11 of section A is connected to ground. The reference input terminals 13 of sections A and B are connected by lead 14 to the output terminal 15 of a reference voltage generator 16 which may be a conventional integrator of the type which gives the integral with respect to time of an input voltage E–2, which desirably is tapped from a potentiometer 17, the contact arm 18 of which is connected through resistor 19 to the input terminal 21 of the integrator 16. This integrator illustratively may be of the type shown and described in Electronic Analog Computers, first edition, McGraw-Hill, Corn & Corn, 1952, at page 143, and has a capacitor 22 which together with the resistor 19 determines the time constant of the integrator.

Although the comparator unit 12 may be of any suitable type, in the illustrative embodiment herein, each of the sections A and B may be an amplitude comparison circuit known as the "multiar." This circuit, shown in FIG. 3, which is described in the Massachusetts Institute of Technology, Radiation Laboratory Series, publication entitled "Waveforms," at page 343, comprises a transformer T, one end of one of the windings of which is connected to input terminal 13 and the other end of said winding being connected to the cathode 24 of a diode 25. The plate 26 of diode 25 is connected through resistor 27 to input terminal 11 and through capacitor 29 and resistor 31 to the B+ source and also to the control grid 32 of a pentode vacuum tube 33. The cathode 34 of tube 33 is connected by lead 35 to one end of the other winding of transformer T, the other end of said winding being connected by lead 36 to ground. The screen grid 38 of tube 33 is connected through resistor 39 to the B+ source and also to ground through capacitor 41. The suppressor grid 42 of tube 33 is grounded and the plate 43 of the tube is connected through resistor 44 to B+ supply and to output terminal 45.

Output terminals 45 of sections A and B of the comparator unit 12 are connected respectively through capacitors 53 and 54 to the control grids 55 of tubes 56 and 57 of a bi-stable multi-vibrator 58 (FIG. 4) of conventional type. The multi-vibrator is so biased that the tube 57 is normally conducting and the tube 56 is cut off.

The plate 59 of tube 57 is connected by lead 61 through resistor 60 to the suppressor grid 62 of a gate tube 63, said suppressor grid being connected through resistor 60' to a negative voltage. The cathode 64 of such tube is connected in conventional manner to ground and the control grid 65 is connected by lead 66 to a pulse generator 67 of conventional type which may be a crystal controlled oscillator having a frequency of say 1,000 kc. The plate 69 of gate tube 63 is connected by lead 70 through capacitor 71 to the input 73 of resistor-network 74.

The resistor-network 74 is pulse operated and as illustratively shown, comprises ten identical stages S-1 through S-10.

As shown in FIG. 1, each stage comprises a diode 75 having two sections A and B. The input terminal 73 is connected by lead 76 through capacitor 77 to the cathodes 78 of sections A and B and through resistor 79 to B+ supply, illustratively 300 v. The plate 81 of section A is connected by lead 82 to input terminal 73' of the next stage S-2; to the plate 83 of section D of a vacuum tube 84 having two triode sections C and D as well as through resistor 85 to the B+ supply. In addition, the plate 81 is connected to one end of voltage divider resistor 86, the other end of which is connected to the control grid 87 of section C of tube 84 and to one end of resistor 88, the other end of which is connected illustratively to -300 volts.

The plate 89 of section C of tube 84 is connected by lead 91 to the plate 92 of section B of diode 75 and to one end of voltage divider resistor 93, the other end of which is connected to the control grid 94 of section D of tube 84 and to one end of resistor 95, the other end of which is connected to -300 volts.

The plate 89 of section C of tube 84 is also connected by lead 96 through plate load resistor 96' to one side of the coil 97 of relay 98, the other side of said coil being connected by lead 99 to the B+ supply.

The relay 98 has a pair of normally open contacts 101, 102, the contact 101 being connected through resistor 103 to common main 104 connected to terminal 105 to which voltage E-3 is applied. The contact 102 is connected to common main 106 which is connected through resistor 107 to ground, the resistor 107 being the output resistor having an output terminal 108.

The cathode 111 of section D of tube 84 is connected to ground and the cathode 112 of section C of said tube is connected through the normally closed contacts 113 of relay 114 to ground. The coil of relay 114 has one end connected to ground and the other end connected through common main 115 to normally open switch 116, which leads to a source of potential.

For purpose of illustration, it is assumed that the resistors 103 of stages S-1 to S-10 inclusive have values of 5.12 megohms, 2.56 megohms, 1.28 megohms, .64 megohm, .32 megohm, .16 megohm, .08 megohm, .04 megohm, .02 megohm and .01 megohm respectively, and resistor 107 has a value of ½ ohm.

The reference voltage generator 20 illustratively has a time constant of .003 second, i.e., the resistor 19 and capacitor 22 could have values of 30K and .1 µf. respectively. Thus, with a voltage of say 300 volts tapped off potentiometer 17, the slope of the output voltage from voltage generator 16 is at the rate of 300 volts per 3 milliseconds.

Assuming that a voltage at terminal 10 having a value of .1 volt represents a count of "one," as the slope of the reference voltage is 300 volts per .003 second, it will take the reference voltage .000001 second to reach .1 volt and during this period the oscillator 67 which is a 1,000 kc. oscillator, will deliver 1 pulse.

OPERATION

To start the equipment for a multiplying cycle, for example, assuming that the input voltage to terminal 10 has a value of .1 representing a factor of one and the voltage at terminal 105 has a value of 10.24 volts representing a factor of one, the integrator 16 is reset by momentary closure of switch 120 which will discharge capacitor 22, and the switch 116 is closed to energize all of the relays 114 of the ten stages. As a result, the ground circuit of section C of all of the tubes 84 will be opened and none of the sections C will conduct.

As the plates 83 of all of the sections D of tubes 84 are connected through resistor 85 to B+, all of the sections D will conduct heavily.

As a result, when switch 116 is opened, closing the ground circuit to sections C, since conduction of section D will cause the voltage at plate 83 thereof to drop to say 100 volts, the voltage across resistors 86, 88 will be approximately 400 volts and the control grid 87 of section C will be negative to keep the section non-conducting.

At this time, the plate 81 of section A of diode 75 will be negative with respect to its cathode 78 which is tied to B+ 300 and the plate 92 of section B of diode 77 which is connected by lead 91 to the plate 89 of non-conducting section C, will be at substantially the same potential as the cathode 78 of diode 75.

With the voltage of 300 volts applied to resistor 19 of the voltage generator 16, the latter will integrate this voltage with a time constant of .003 second in the illustrative embodiment shown. As a result, a negative going saw tooth will appear at terminal 15 as the capacitor 22 is charged. This negative going signal will be applied to terminals 13 of sections A and B of the comparator 12.

Referring to FIG. 3, the tube 33 of section A is ordinarily conducting strongly and the plate 26 of tube 25 is connected through resistor 27 to terminal 11 which is connected to ground. Since the negative going saw tooth voltage from generator 16 which is fed to terminal 13 of section A is intentionally clamped above ground potential, the cathode 24 of tube 25 connected through transformer T to terminal 13 is at a more positive potential than plate 26 and the tube 25 is not conducting. When the saw tooth voltage drops to equal the reference point or ground potential connected to terminal 11 the diode 25 will conduct to complete the circuit to the control grid 32 of tube 33. This will cause the blocking oscillator including tube 33, conducting tube 25, transformer T and associated components to function to drive tube 33 to cut off. As a result, there will be a rapid rise of the plate potential of tube 33 which will appear at output terminal 45.

This positive going voltage will be applied through capacitor 53 to the control grid 55 (FIG. 4) of normally cut off tube 56 of the multi-vibrator 58 thereby causing such tube to conduct so that the plate voltage thereof will drop rapidly. As a result, the control grid of tube 57 will be driven negative to cut off tube 57. This will cause the plate voltage of tube 57 to rise so that the suppressor grid 62 of normally cut off gate tube 63 will become positive so that such tube will conduct with the result that the pulses at the plate 69 of gate tube 63 will be applied to terminal 73 of unit 74.

Assuming that the input voltage is .1 volt, when the negative going saw tooth voltage from the voltage generator 16 which is applied to terminal 13 of section B, reaches .1 volt which will take .000001 second, 1 pulse will have been delivered by the 1,000 kc. pulse generator 67 to the input terminal 73 of unit 74.

When the voltages applied to terminals 11 and 13 of section B of the comparator 12 are equal, as previously described, tube 33 of section B will be cut off and a positive going voltage will be applied to the grid 55 of tube 57 of the multivibrator 58 which is now cut off. As a result, the tube 57 will conduct and tube 56 will be cut off.

When tube 57 conducts, its plate voltage will drop and a negative going voltage will be applied through lead 61 to the suppressor grid 62 of gate tube 63 so that no further negative pulses will be delivered to terminal 73 of unit 74.

When one negative pulse is applied to terminal 73, since the cathode 78 of section A of diode 75 is positive with respect to its plate 81, the pulse will not pass through said section A, but it will pass through section B whose plate and cathode 92, 78 are at substantially the same potential.

As a result, such negative pulse will be applied to the grid 94 of section D of tube 84 to cut off said section. This will cause a rise in its plate voltage to provide a positive going signal on the grid 87 of section C of tube 84, which section will thereupon conduct.

This will cause the plate voltage of section C to drop as will the voltage on the plate 92 of section B of diode 75 rendering such plate negative with respect to the cathode 78. When the plate voltage of section D of tube 84 increased with cut off of said section, the voltage of plate 81 of section A of diode 75 increased to substantially the value of cathode 78.

When current flows through section C of tube 84, the relay 98 is energized to close its contacts 101, 102 connecting resistor 103 of stage S–1 which illustratively has a value of 5.12 megohms in series with output resistor 107 which has a value of ½ ohm and 10.24 volts at terminal 105 is applied across said resistors.

As a result, the current flow through resistors 103 and 107 (5.12 megohms+½ ohm), the latter of which is negligible, is approximately 2 microamperes and this current will flow through output resistor 107 to provide a voltage of 1 microvolt, which in the illustrative example herein described, is proportional to "one."

Thus, with the voltage at terminal 10 of .1, representing E–1 or "one" and the voltage at terminal 105 of 10.24 volts representing E–3 or "one," the output voltage is $E-1 \times E-3 = 1$ or "one."

Assuming that it is desired to multiply $E-1 \times E-3$, where $E-1=3$, $E-3=1$, then the value of E–1 would be .3 volt and it would take the saw tooth voltage from generator 16 .000003 second to reach this value. As a result, three pulses will be applied to terminal 73 before the gate tube 63 is cut off in the manner previously described since the 1,000 kc. generator delivers 1 pulse every .000001 second.

As previously described, the first pulse will cause section C of tube 84 of stage S–1 to conduct and the contacts 101, 102 of its associated relay 98 would start to close. The second pulse, would pass through section A of diode 75 as the plate and cathode 81, 78 thereof are now at substantially the same potential as previously described. This would cause section C of tube 84 to be cut off and section D to again conduct and at the same time, the negative pulse appearing at the plate of section A of diode 75 would be applied to terminal 73' of stage S–2.

Although the contacts 101, 102 of relay 98 of stage S–1 started to close when section C of tube 84 of this stage conducted, as the minimum relay closure time is in the order of say 5 milliseconds, the second pulse which occurred .000001 second after the first pulse, would have cut off section C of tube 84 of stage S–1 before the contacts 101, 102 had time to close.

The negative pulse applied to terminal 73' of stage S–2 would in the manner previously described with respect to stage S–1, cause section C of tube 84 of stage S–2 to conduct to close the contacts 101, 102 of its relay 98. Before such contacts could close, the third pulse would be applied to terminal 73 of stage S–1 and as previously described, section D of tube 84 would be cut off and section C would conduct to cause the contacts 101, 102 of its relay 98 to start to close.

Since the negative pulse to terminal 73 was applied when only section B of diode 75 was in condition to conduct, i.e., its plate and cathode were at substantially the same potential, no negative pulse would be applied to terminal 73' of stage S–2 or subsequent stages.

Consequently, since there are no further pulses, both relays 98 of stages S–1 and S–2 will be energized to permit closure of their contacts 101, 102.

As a result, the resistors 103 of stages S–1 and S–2 which have values of 5.12 megohms and 2.56 megohms respectively, would be connected in parallel to provide a total resistance of $$\frac{1}{5.12} + \frac{1}{2.56} = \frac{1}{T}$$

or $$\frac{1+2}{5.12} = \frac{1}{T}$$

$$T = \frac{5.12}{3} = 1.70\tfrac{2}{3} \text{ megohms}$$

This value of 1.70⅔ megohms in series with the output resistor 107 of ½ ohm is one-third the value of the resistor 103 of stage S–1 which has a value of 5.12 megohms and which provides a current of 2 microamperes. Thus, three times the current will flow through resistor 107 or 6 microamperes for an output voltage of 3 microvolts or three.

It is apparent therefore that by increasing the input voltage E–1 at terminal 10 with the voltage E–3 at terminal 105 remaining at 10.24 volts proportional to a value of "one," the product of $E-1 \times E-3$ is determined as the output across resistor 107.

It is of course obvious that by increasing E–3 applied to terminal 105, the output voltage will also be increased. Thus, if E–3 is doubled to say 20.48 volts, with E–1 equal to .3 volt, the current across parallel resistors 103 of stages S–1 and S–2 in series with resistor 107 would be doubled to 12 microvolts or six.

A partial chart to indicate the functioning of the stages S–1 to S–10 is as follows where the letter C or D in the same line as the number of pulses indicates which of the tubes C or D is conducting and only when tube C is conducting will the associated resistor 103 be in circuit.

Chart I

| Stage | S-1 | | S-2 | | S-3 | | S-4 | | S-5 | | S-6 | | S-7 | | S-8 | | S-9 | | S-10 | |
|---|---|---|---|---|---|---|---|---|---|---|---|---|---|---|---|---|---|---|---|---|
| Pulses | C | D | C | D | C | D | C | D | C | D | C | D | C | D | C | D | C | D | C | D |
| 1 | C | | | D | | D | | D | | D | | D | | D | | D | | D | | D |
| 2 | | D | C | | | D | | D | | D | | D | | D | | D | | D | | D |
| 3 | C | | C | | | D | | D | | D | | D | | D | | D | | D | | D |
| 4 | | D | | D | C | | | D | | D | | D | | D | | D | | D | | D |
| 5 | C | | | D | C | | | D | | D | | D | | D | | D | | D | | D |
| 6 | | D | C | | C | | | D | | D | | D | | D | | D | | D | | D |
| 7 | C | | C | | C | | | D | | D | | D | | D | | D | | D | | D |
| 8 | | D | | D | | D | C | | | D | | D | | D | | D | | D | | D |
| 9 | C | | | D | | D | C | | | D | | D | | D | | D | | D | | D |
| 10 | | D | C | | | D | C | | | D | | D | | D | | D | | D | | D |
| 11 | C | | C | | | D | C | | | D | | D | | D | | D | | D | | D |
| 12 | | D | | D | C | | C | | | D | | D | | D | | D | | D | | D |
| 13 | C | | | D | C | | C | | | D | | D | | D | | D | | D | | D |

Thus with from 1 to 13 pulses delivered to terminal 73, the value of resistors 103 in circuit in megohms is as follows:

Chart II

1. $5.12$
2. $2.56$
3. $\frac{1}{5.12}+\frac{1}{2.56}=1.70\tfrac{2}{3}$
4. $1.28$
5. $\frac{1}{5.12}+\frac{1}{1.28}=1.02\tfrac{2}{5}$
6. $\frac{1}{2.56}+\frac{1}{1.28}=.85\tfrac{1}{3}$
7. $\frac{1}{5.12}+\frac{1}{2.56}+\frac{1}{1.28}=.73\tfrac{1}{7}$
8. $.64$
9. $\frac{1}{5.12}+\frac{1}{.64}=.56\tfrac{8}{9}$
10. $\frac{1}{2.56}+\frac{1}{.64}=.51\tfrac{1}{5}$
11. $\frac{1}{5.12}+\frac{1}{2.56}+\frac{1}{.64}=.46\tfrac{6}{11}$
12. $\frac{1}{1.28}+\frac{1}{.64}=.42\tfrac{2}{3}$
13. $\frac{1}{5.12}+\frac{1}{1.28}+\frac{1}{.64}=.39\tfrac{5}{13}$ It is of course to be understood that the time constant of the reference voltage generator could be greater than the operating time of the relays, i.e., it could be say 6 milliseconds.

In such event it is apparent that several of the relays could close before the gate tube 63 is de-energized and no reading can be taken from the output before this time.

This is accomplished by having a programmer P, FIG. 2, which energizes the relay 121 to connect the output of resistor 107' to the output terminal 108' say every 6 milliseconds when it simultaneously cuts off the reference voltage generator which will have attained a 300 volt rise at such time.

In such case the pulse generator 67 could have a pulse repetition frequency of say 500 kc. which would provide one pulse to the resistor network every two microseconds.

Thus, after 6 milliseconds, the desired combination of resistors 103 would be in circuit related to the maximum input voltage and the output across resistor 107' would be proportional to the product of $E-1 \times E-3$.

The programmer P could then recycle the reference voltage generator 16 and open the contacts 122 of relay 121 to repeat the operation. To give relay 121 time to open, the reference voltage generator could be recycled say every 11 milliseconds.

By changing the slope of the reference voltage generator, the equipment can also determine the quotient. Thus, if potentiometer 17 is adjusted so that the voltage E-2 applied to the input 21 of the reference voltage generator is say 600 volts with a time constant of 3 milliseconds, the number of pulses that will pass through the gate tube 63 will be halved thereby to be divided by two.

It is apparent therefore that by varying the potentiometer any desired divisor can be provided.

With the equipment above described, multiplication and division of two or more factors may readily be accomplished in a short period of time to provide an output suitable for use in other computing functions.

It is, of course, to be understood that by having the reference generator 16 produce other than linear wave forms, i.e., a parabola, for example, it is within the scope of the invention, utilizing the same equipment, to have the resistors 103 set into circuit, of value proportional to the square root of the input voltage. In such case the output across resistor 107 would be equal to $\sqrt{E-1} \times E-3$.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment of the character described comprising a reference generator having an output to provide an electrical signal whose value varies with time, a pulse generator, a pulse actuated impedance network, means to compare the value of the electrical signal from the reference generator, with an input signal, means controlled by said comparing means to apply pulses from said pulse generator to said impedance network when the electrical signal from the reference generator is of predetermined value and to discontinue the application of pulses to said network when said electrical signal from said reference generator has a predetermined relation to such input signal, said impedance network having a plurality of identical stages, each stage having a pair of current controlling elements, means biasing said elements so that one is normally conducting and the other is cut off, a relay controlled by the normally cut-off element of each of said stages, a resistor controlled by each of said relays, each of said resistors being of value proportional to a predetermined value, a fixed output resistor of predetermined value that is negligible as compared to the relay controlled resistors, said relays when energized when the associated normally cut off element become conductive, connecting a selected combination of said resistors of a total value inversely proportional to the value of the first input signal in series with the output resistor, and means to provide a second input signal across said selected combination and said output resistance, whereby with such second input signal proportional to one factor and the first input signal proportional to another factor the voltage across the output resistor is proportional to the product of such two factors.

2. The combination set forth in claim 1 in which said reference generator is an integrating device which provides such time varying signal output, an output terminal is associated with said output resistor, an output relay having a pair of normally open contacts is connected between said output resistor and said output terminal and a programmer is provided having means to energize said relay to close said contacts and to cut off said integrator after said integrator output voltage has attained a predetermined value and after closure of the relays of said network, and means in said programmer to thereupon de-energize said output relay and recycle said integrator.

3. The combination set forth in claim 1 in which the resistor associated with the first stage in the network has a predetermined value and each succeeding resistor in the network is one-half the resistance value of the preceding resistor and the pulses fed to the networks connect resistance in circuit that is the quotient of the value of the first resistor divided by the number of pulses.

4. The combination set forth in claim 1 in which the reference generator is an integrating device which provides such time varying electrical signal, said reference generator having an input to which a third input signal may be applied, whereby variations in the value of the third input signal will cause the voltage across the output resistor to change inversely.

5. Equipment of the character described comprising a reference generator having an output to provide an electrical signal whose value varies with time, a pulse generator, a pulse actuated impedance network, means to compare the value of the electrical signal from the reference generator, with an input signal, said comparing means having two identical sections, each comprising a vacuum tube adapted to be normally conductive, said vacuum tube having a plate, a control grid and a cathode, each of said sections having an output connected to the plate of the associated vacuum tube, a diode having a plate connected to the control grid of said vacuum tube aud a cathode, a transformer having a primary winding connected at one end to the cathode of said diode and at its other end defining an input, and a secondary winding connected at one end to ground and at its other end to the cathode of said vacuum tube, said transformer and said vacuum tube having associated components to define a blocking oscillator, the input of one of the transformers being connected to the output of the reference generator and the input signal being applied to the input of the other transformer, a normally cut-off gate tube controlled by said comparing means and electrically connected between said impedance network and said pulse generator to apply pulses to said impedance network when said gate tube is conducting, and means controlled by said comparing means to effect conduction and cut-off of said gate tube, said means comprising a multi-vibrator controlling said gate tube and having a normally conducting and normally cut-off tube, means to feed the output of said two sections of said comparing means to said multi-vibrator alternately to effect conduction of said normally cut-off tube thereof and conduction of said gate tube when the signal from the reference generator is of predetermined value, and to effect cut-off of said non-conducting tube of said multivibrator and cut-off of said gate tube when said electrical signal from said reference generator has a predetermined relation to said input signal, and means controlled by the application of pulses to said impedance network to set impedance in circuit of value proportional to the value of said input signal, and means to provide a second input signal across said impedance to provide an output that is a function of the impedance and the second input signal.

References Cited in the file of this patent
UNITED STATES PATENTS

| | | |
|---|---|---|
| 2,621,292 | White | Dec. 9, 1952 |
| 2,700,750 | Dickinson | Jan. 25, 1955 |
| 2,715,678 | Barney | Aug. 16, 1955 |
| 2,781,970 | Kaufman | Feb. 19, 1957 |
| 2,901,610 | Brown | Aug. 25, 1959 |

OTHER REFERENCES

Electronics, vol. 24, November 8, August 1951, pp. 120–124, "Step Multiplier in Guided Missile Computer," by E. A. Goldberg.